(12) United States Patent
McBeth

(10) Patent No.: US 10,712,899 B2
(45) Date of Patent: Jul. 14, 2020

(54) HUMAN-MACHINE INTERFACE TETHERED TO A USER POSITION IN A THREE-DIMENSIONAL VR OR AR ENVIRONMENT

(71) Applicant: Microsoft Technology Licensing, LLC, Redmond, WA (US)

(72) Inventor: Sean Kenneth McBeth, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/786,557

(22) Filed: Oct. 17, 2017

(65) Prior Publication Data

US 2019/0114052 A1 Apr. 18, 2019

(51) Int. Cl.
| | |
|---|---|
| G06F 3/0481 | (2013.01) |
| G02B 27/01 | (2006.01) |
| G02B 27/00 | (2006.01) |
| G06F 3/01 | (2006.01) |

(52) U.S. Cl.
CPC ..... *G06F 3/04815* (2013.01); *G02B 27/0093* (2013.01); *G02B 27/0172* (2013.01); *G06F 3/011* (2013.01); *G02B 2027/0178* (2013.01)

(58) Field of Classification Search
CPC . G06F 3/04815; G06F 3/011; G02B 27/0093; G02B 27/0172; G02B 2027/0178
See application file for complete search history.

(56) References Cited

U.S. PATENT DOCUMENTS

| | | | | |
|---|---|---|---|---|
| 2010/0177931 | A1* | 7/2010 | Whytock | G06F 3/0416 382/103 |
| 2014/0368535 | A1* | 12/2014 | Salter | G06F 3/011 345/619 |
| 2015/0153913 | A1* | 6/2015 | Ballard | H04W 76/10 715/727 |
| 2015/0338915 | A1* | 11/2015 | Publicover | G06K 9/0061 345/633 |
| 2015/0352441 | A1* | 12/2015 | Lin | A63F 13/428 463/36 |
| 2015/0381974 | A1 | 12/2015 | Hoffman et al. | |
| 2016/0063762 | A1 | 3/2016 | Heuvel et al. | |
| 2016/0210784 | A1 | 7/2016 | Ramsby et al. | |
| 2017/0039881 | A1* | 2/2017 | Belch | G09B 19/0038 |
| 2017/0123492 | A1* | 5/2017 | Marggraff | G06F 3/0236 |

(Continued)

OTHER PUBLICATIONS

"International Search Report and Written Opinion Issued in PCT Application No. PCT/US2018/055116", dated Jan. 21, 2019, 13 Pages.

*Primary Examiner* — Tadesse Hailu
(74) *Attorney, Agent, or Firm* — Newport IP, LLC; Benjamin A. Keim

(57) ABSTRACT

Techniques are shown for controlling spacing between a user and a UI that involve monitoring a user position relative to the UI. A first region is defined to determine a maximum spacing. When the user position is outside the first region, a reference point of the UI is moved toward the user position until the user position is within the first region. A second region is defined to determine a minimum spacing. When the user position is outside the second region, the reference point is moved toward the user position until the user position is within the second region.

20 Claims, 14 Drawing Sheets

(56) References Cited

U.S. PATENT DOCUMENTS

| | | | |
|---|---|---|---|
| 2017/0185148 A1* | 6/2017 | Kondo | G06F 3/011 |
| 2017/0228921 A1* | 8/2017 | Buhlmann | G06F 3/033 |
| 2017/0235462 A1* | 8/2017 | Zhou | G06F 3/013 |
| | | | 715/862 |
| 2018/0011531 A1* | 1/2018 | Clement | G06F 3/011 |
| 2018/0045963 A1* | 2/2018 | Hoover | G06F 3/011 |
| 2018/0095616 A1* | 4/2018 | Valdivia | G06Q 50/01 |
| 2018/0098059 A1* | 4/2018 | Valdivia | H04L 51/16 |
| 2018/0122043 A1* | 5/2018 | Energin | G06F 3/04845 |
| 2018/0224935 A1* | 8/2018 | Thunstrom | G06F 3/013 |
| 2018/0232056 A1* | 8/2018 | Nigam | G06F 3/017 |
| 2018/0315248 A1* | 11/2018 | Bastov | G06F 3/011 |
| 2018/0373412 A1* | 12/2018 | Reif | G02B 27/0172 |
| 2020/0074740 A1* | 3/2020 | Singh | G06T 19/006 |

\* cited by examiner

HUMAN-MACHINE INTERFACE TETHERED TO A USER POSITION IN A THREE-DIMENSIONAL VR OR AR ENVIRONMENT

BACKGROUND

At present, there are a growing number of fields for virtual reality ("VR") systems and augmented reality ("AR") systems that allow a user to visualize virtual environments or augmented images that are combined with the real-world physical environment to create a mixed reality environment. These fields include, for example, scientific visualization, medicine and military training, engineering design and prototyping, tele-manipulation and tele-presence, and personal entertainment systems.

VR systems allow a user to visualize computer generated images in a virtual environment. Unlike AR systems, VR headsets usually have opaque displays where computer-generated images, objects, or virtual scenes are displayed on the opaque displays while concurrently not allowing visualization of the outside real-world physical environment.

Conversely, AR systems usually have transparent displays that allow visualization of the outside real-world physical environment while concurrently displaying computer-generated holographic, e.g. augmented images. In other words, an AR headset includes a transparent display that allows a user to see through the transparent display to the outside real-world physical environment while simultaneously seeing computer-generated images on the transparent display, which are combined with a view of the real-world physical environment to form a combined visual environment, e.g. augmented images, in the field of view of the user. The combined visual environment includes a view of both the real-world physical environment and the holographic or augmented images. An example of an AR headset is a Near-Eye-Display ("NED") system that superimposes computer-generated images ("CG images") over a user's view of a real-world environment.

One example of a CG image that may be presented to a user of a NED system is a user interface ("UI"), such as a curved UI. However, users of AR and VR systems often move with respect to the UI. If a user moves within the environment, but the UI remains in its original position, then the user might have difficulty viewing or interacting with UI and, in some scenarios, may not be able to view or interact with the UI. In particular, a curved UI works best when the user is at the center of the curve of the UI.

One conventional solution to the problem described above is to directly tether the UI to the user's position so that the UI moves as the user moves. This approach, however, results in frequent movement of the UI, which can make the UI difficult for the user to interact with and might cause the user discomfort, e.g. virtual reality sickness similar to motion sickness. A frequently moving UI can result in inaccurate and inadvertent user input leading to unnecessary and ineffective usage of computer resources, such as processor cycles, memory and battery, as well as user frustration.

SUMMARY

Disclosed are technologies for controlling a human-machine interface position with respect to a user position in a three-dimensional ("3D") VR or AR environment that permit a user to move with respect to interface without immediately causing the interface to change position relative to the user. The disclosed technologies reduce frequent movement of the interface thereby reducing inaccurate and inadvertent user input and avoiding unnecessary and ineffective usage of computer resources. The reduced frequent movement of the disclosed technologies also improves the usability of the UI, increasing the efficiency of user input, reducing user frustration, and reducing user discomfort, e.g. virtual reality sickness.

The disclosed technologies involve a VR or AR device generating a UI in a VR or AR environment, where the UI has a reference point relative to the UI, such as a center point or focal point of the curvature of the UI. The VR or AR device monitors the user's position relative to the UI in the VR or AR environment. The VR or AR device detects when the user position is outside of a region defined relative to the reference point, where the region determines a maximum spacing between the user position and the UI.

When the VR or AR device detects when the user position is outside of the defined region, the VR or AR device moves the reference point of the UI toward the user position until the user position is within the defined region, which moves the UI toward the user and within the maximum spacing determined by the defined region. The defined region may be one or more geometric shapes or regions defined with respect to the user position or the UI.

Another region may be defined relative to the reference point, where this region determines a minimum spacing between the user position and the UI. When the VR or AR device detects when the user position is outside of this defined region, the VR or AR device moves the reference point of the UI toward the user position until the user position is within this defined region, which moves the UI away from the user and maintains the minimum spacing determined by this defined region.

Other devices, apparatus, systems, methods, features and advantages of the disclosed technologies will be or will become apparent to one with skill in the art upon examination of the following figures and detailed description. It is intended that all such additional systems, methods, features and advantages be included within this description, be within the scope of the disclosed technologies, and be protected by the accompanying claims.

BRIEF DESCRIPTION OF THE FIGURES

The disclosed technologies may be better understood by referring to the following figures. The components in the figures are not necessarily to scale, emphasis instead being placed upon illustrating the principles of the disclosed technologies. In the figures, like reference numerals designate corresponding parts throughout the different views.

DETAILED DESCRIPTION

Technologies are disclosed for presenting and interacting with a human-machine interface provided by a VR or AR device. In particular, a CG image, such as a UI, presented by a VR or AR device is elastically tethered to a user position in a VR or AR, whereby the UI moves with the user, but the user has a range of motion that does not immediately cause the UI to move, as in a directly tethered arrangement. The VR or AR device generates a UI in a VR or AR environment, the UI having a reference point related to the UI. The VR or AR device monitors the position of a user relative to the UI. The disclosed technologies also include detecting when the user position is outside of a first region relative to the UI and, responsive thereto, moving the reference point of the UI toward the user position until the user position is within the first region, thereby controlling a maximum spacing between the user position and the UI The disclosed technologies can also include detecting when the user position is within a second region associated with the UI and, responsive thereto, moving the reference point of UI in the virtual environment toward the user position until the user position is not within the second region, thereby controlling a minimum spacing between the user position and the UI.

The disclosed technologies permit a user to move with respect to a UI without immediately causing the UI to change position relative to the user, as encountered with conventional tethered solutions. The disclosed technologies reduce frequent movement of the UI thereby reducing inaccurate and inadvertent user input and avoiding unnecessary and ineffective usage of computer resources, such as processor cycles, memory and battery. The reduced frequent movement of the disclosed technologies also improves the usability of the UI, increasing the efficiency of user input, reducing user frustration, and reducing user discomfort, e.g. virtual reality sickness.

Figure 1A:
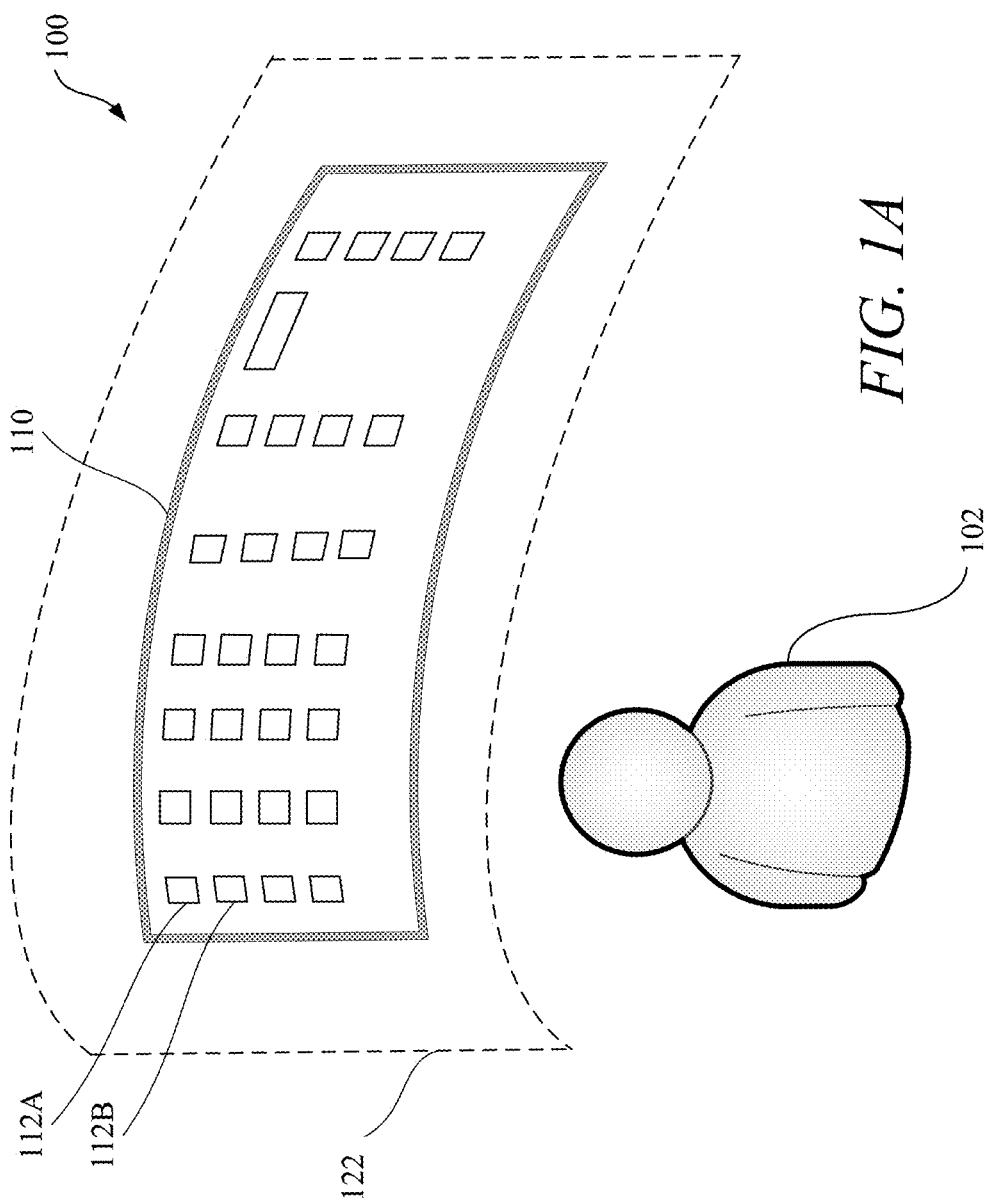
FIG. 1A is a schematic view illustrating a curved UI displayed on a cylindrically curved visual surface of a VR or AR environment.

FIG. 1A is a schematic diagram illustrating an example of a VR or AR environment 100, wherein a user 102 wearing a NED headset, such as the one illustrated in FIG. 7 and described in detail below, is presented with a UI 110 presented on a cylindrically curved visual surface 122 of the VR or AR environment. The UI 110 may include multiple UI elements, such as UI elements 112A and 112B, presented in the VR or AR environment, which may be viewed and interacted with by the user 102.

Figure 1B:
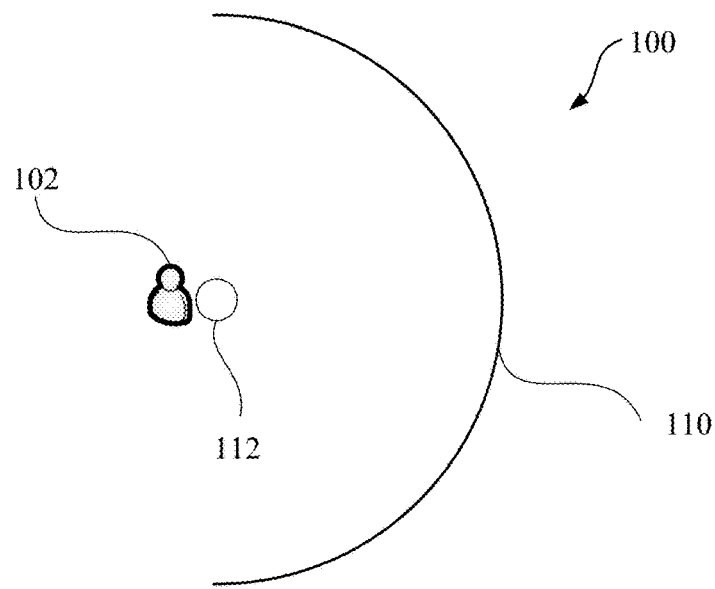
FIG. 1B is a schematic view illustrating an example of a user positioned with respect to a curved UI in a VR or AR environment.

FIG. 1B is a schematic diagram illustrating an example of a user 112 positioned with respect to a UI 110 in an VR or AR environment. In the example of FIG. 1B, user 102 is positioned in an VR or AR environment 100 at a reference point 112, which is related to the position of the UI 110. In this example, reference point 112 is a center point, but reference point 112 may be a focal point for a curvature of UI 110, or reference point 112 may be a fixed distance or an algorithmically determined distance relative to the UI 110. Having user 102 positioned at reference point 112, suitably distant from the UI 110, generally provides user 102 with a desirable experience viewing and interacting with UI 110.

Figure 1C:
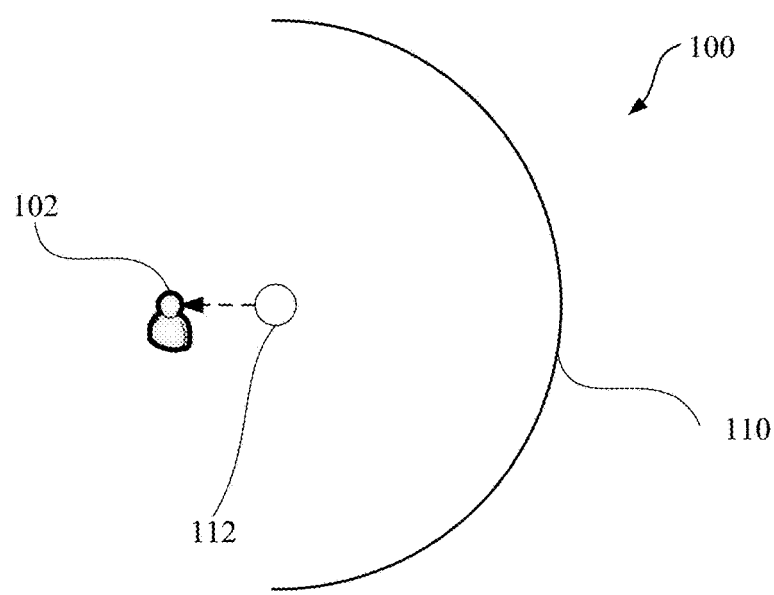
FIG. 1C is a schematic view illustrating an example of a user moving position with respect to a curved UI in a VR or AR environment.

FIG. 1C is a schematic view illustrating an example of user 102 moving position with respect to the UI 110 in VR or AR environment 100. As discussed briefly above, in order to maintain the user at the center of the curvature of the UI 110, known solutions may re-position the UI 110 in lockstep with the user's movements. For example, reference point 112 of UI 110 may be rapidly re-positioned to coincide with the new position of user 102. However, lockstep re-positioning movement of the UI 110 may cause user 102 difficulty in viewing or interacting with UI 110 due to the frequent movement of the UI 110. A frequently moving UI can result in inaccurate and inadvertent user input leading to unnecessary and ineffective usage of computer resources, such as processor cycles, memory and battery, as well as user frustration. Another consequence of frequent movement of the UI can be discomfort for the user, such as virtual reality sickness.

Figure 2A:
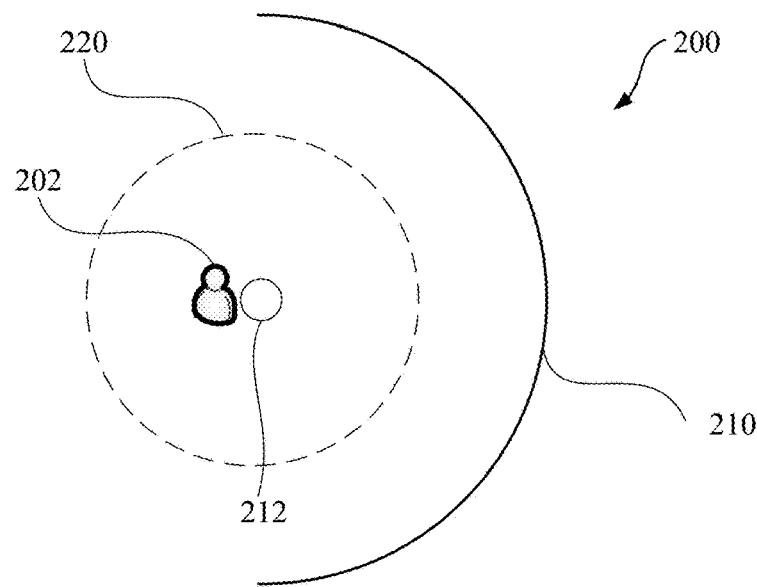
FIG. 2A is a schematic view illustrating an example of an initial position of a curved UI with respect to a user in a VR or AR environment in accordance with the present disclosure.

FIG. 2A is a schematic view illustrating an example of an initial position of a UI 210 with respect to an initial position 202 of a user in a VR or AR environment 200 in accordance with the present disclosure. In the example of FIG. 2A, the UI is a curved UI 210 is generated by a VR or AR device, e.g. a VR or AR headset such as the headset illustrated in FIG. 7, which monitors the user's position relative to UI 210 in VR or AR environment 200. In the example shown, reference point 212 is defined relative to the position of curved UI 210 in the VR or AR environment 200. Reference point 212 may be defined in a variety of ways. For example, reference point 212 may be a center point or focal point of the curved UI 210. In another example, reference point 212 may be defined statically or algorithmically relative to curved UI 210. Note that while a curved UI 210 is utilized in the examples shown, the disclosed technology may be applied to a flat UI or other CG image with which a user may be presented in a VR or AR environment and which may be desirable to move as a result of the user's movement.

Also shown in the example of FIG. 2A is a defined region 220 that is defined with respect to reference point 212 and represents a maximum distance permitted between the user's position and curved UI 220. In the example shown, defined region 220 is shown as a circular region centered on reference point 212, but different geometric shapes may be utilized to define the region 220 as well as multiple geometric shapes. Also, in some examples, the region 220 may be defined with respect to the user's position.

Figure 2B:
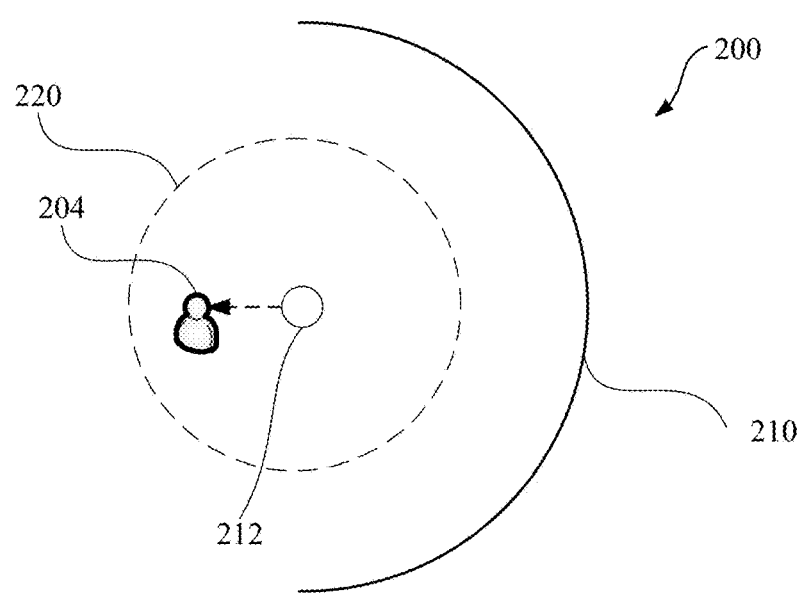
FIG. 2B is a schematic view illustrating an example of movement of a user away from a curved UI within a defined geometric region of space relative to a curved UI in a VR or AR environment that does not result in movement of the UI in accordance with the present disclosure.

FIG. 2B is a schematic view illustrating an example of movement of the user to a different position 204 within the defined region 220 in VR or AR environment 200 in accordance with the present disclosure. As noted above, the user's motion is monitored by the VR or AR device. Note that the user may move about within the defined region 220 without causing curved UI 210 to be moved by the optical system, which may reduce the amount of movement that would otherwise be required if, for example, the reference point 212 of curved UI 210 is directly tethered to the user's position.

Figure 2C:
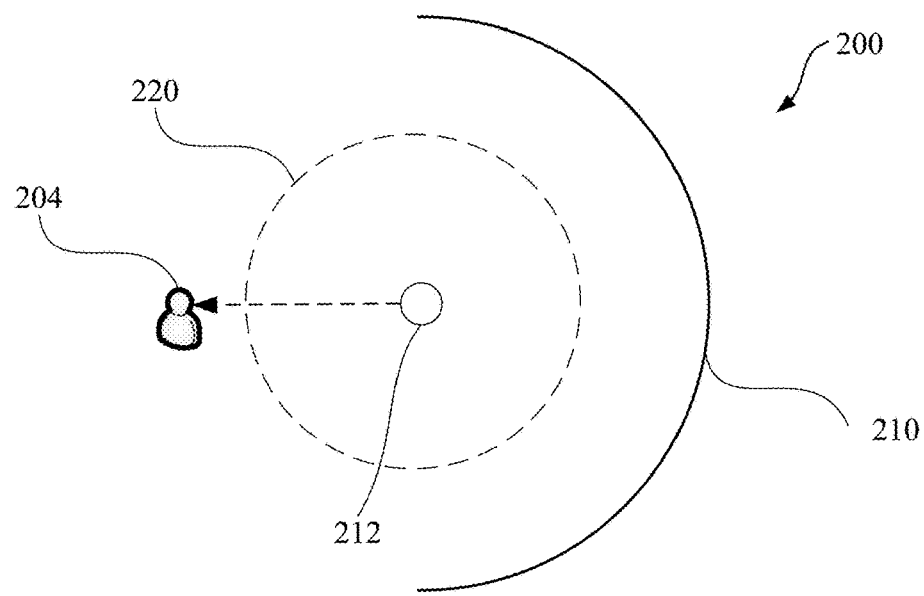
FIG. 2C is a schematic view illustrating an example of movement of a user away from a curved UI with respect to a defined geometric region of space relative to a curved UI in a VR or AR environment that does result in movement of the UI in accordance with the present disclosure.
Figure 2D:
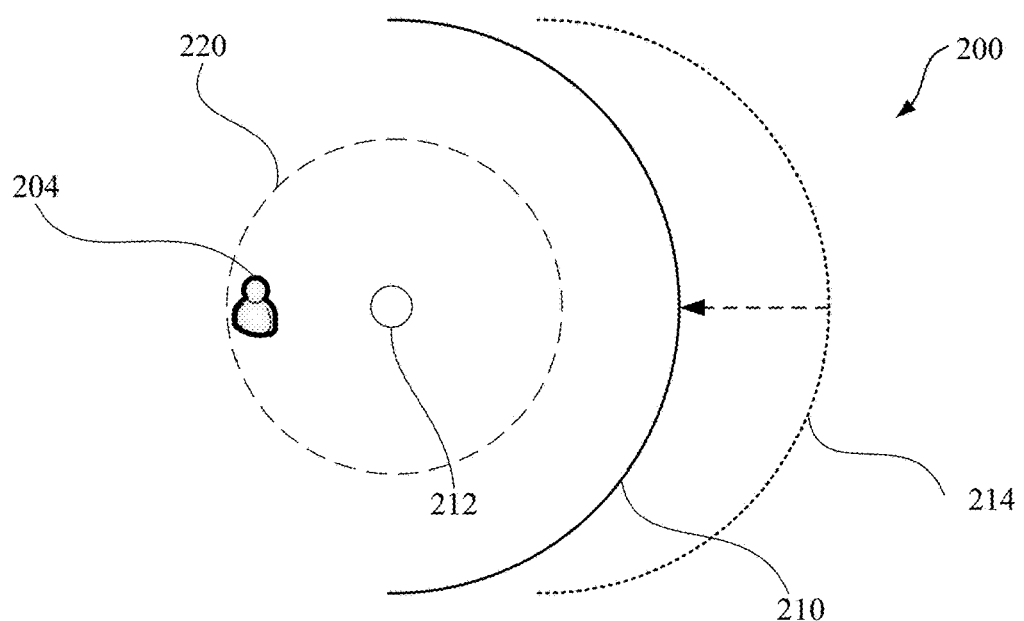
FIG. 2D is a schematic view illustrating an example of movement of a curved UI toward a user in a VR or AR environment in response to the user movement shown in FIG. 2C in accordance with the present disclosure.

FIG. 2C is a schematic view illustrating another example of movement of a user with respect to defined region 220 relative to curved UI 210 in VR or AR environment 200 in accordance with the present disclosure. In this example, the user has moved to a position 204 that is outside of defined region 220, which is detected by the VR or AR device and causes the VR or AR device to move the reference point 212 and, therefore, the curved UI 210 toward the user position in the VR or AR environment. FIG. 2D illustrates the movement of the curved UI 210 in VR or AR environment 200 in response to the user movement shown in FIG. 2C.

In the example of FIG. 2D, the reference point 212 of the curved UI 210 is moved towards the user position 204 until the user position is within the defined region 220 relative to reference point 212, which results in curved UI 210 moving from its original position, illustrated at 214, to the position shown for UI 210. Note that a variety of techniques may be used to control the movement of reference point 212, such as the reference point being moved toward the user position until the user position is just within the boundaries of the defined region 220, as shown in the example of FIG. 2D, or, for example, until the reference point 212 substantially coincides with the user position. Note that whether the reference point 212 is moved until it is merely within region 220 or whether the UI 210 is re-centered on the user position by moving reference point 212 to coincide with the user position is a matter of design choice and does not depart from the claimed scope.

Figure 2E:
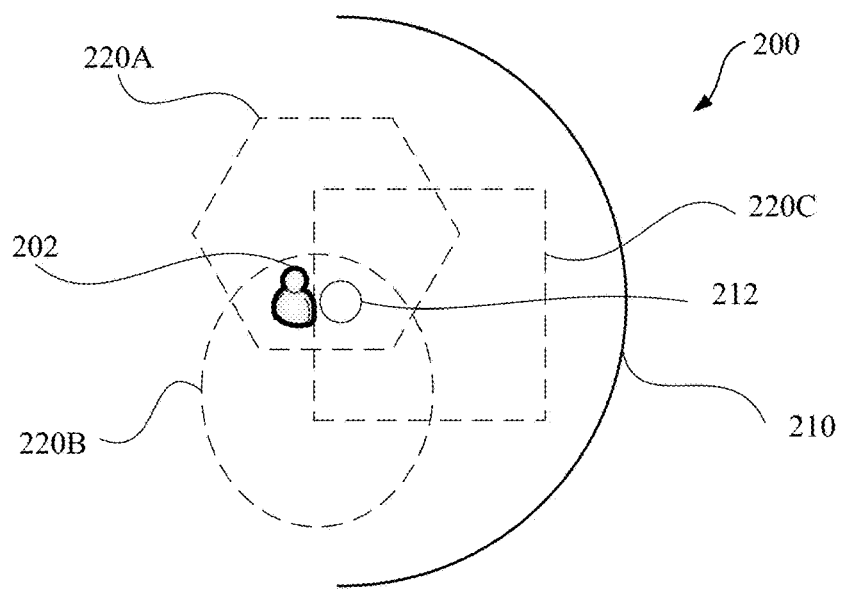
FIG. 2E is a schematic view illustrating additional examples of multiple defined geometric regions of space relative to a curved UI in a VR or AR environment in accordance with the present disclosure.

FIG. 2E is a schematic view illustrating additional examples of multiple defined geometric regions 220A, 220B and 220C relative to curved UI 210 in VR or AR environment 200 in accordance with the present disclosure. Geometric region 220A is a hexagon that is oriented with reference point 212 offset from a center point of the hexagon and positioned adjacent to an edge of the hexagon. Likewise, geometric region 220B is an ellipse with reference point 212 offset from center point of the ellipse and adjacent to one end of the ellipse. Geometric region 220C is a square with reference point 212 positioned adjacent to one edge of the square.

The variety of shapes and positions illustrated demonstrate that the defined region 220 may be defined in many ways without departing from the teachings of the present disclosure. As one of ordinary skill in the art will readily appreciate, many other options may be utilized. For example, the defined region 220 need not be a regular geometric shape and may even be defined in a freehand manner.

Figure 2F:
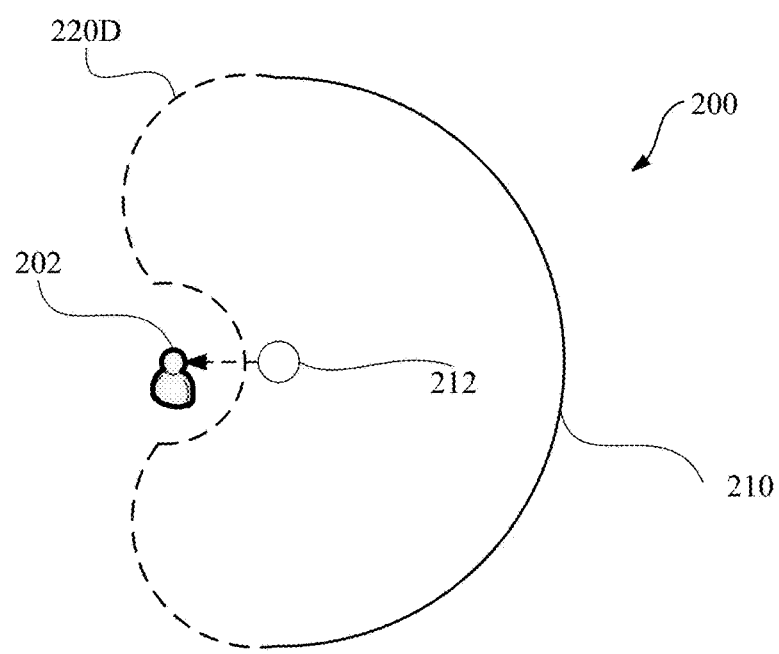
FIG. 2F is a schematic view illustrating an additional example of a defined region of space relative to a curved UI in a VR or AR environment in accordance with the present disclosure.

FIG. 2F is a schematic view illustrating an additional example of a defined region 220D that is defined relative to curved UI 210 in accordance with the present disclosure. The defined region 220D is an irregular shape that includes UI 210 as part of its border. If user 202 moves outside of defined region 220D, as shown, then the VR or AR device will operate to move reference point 212 toward the user position within VR or AR environment 200.

Figure 3A:
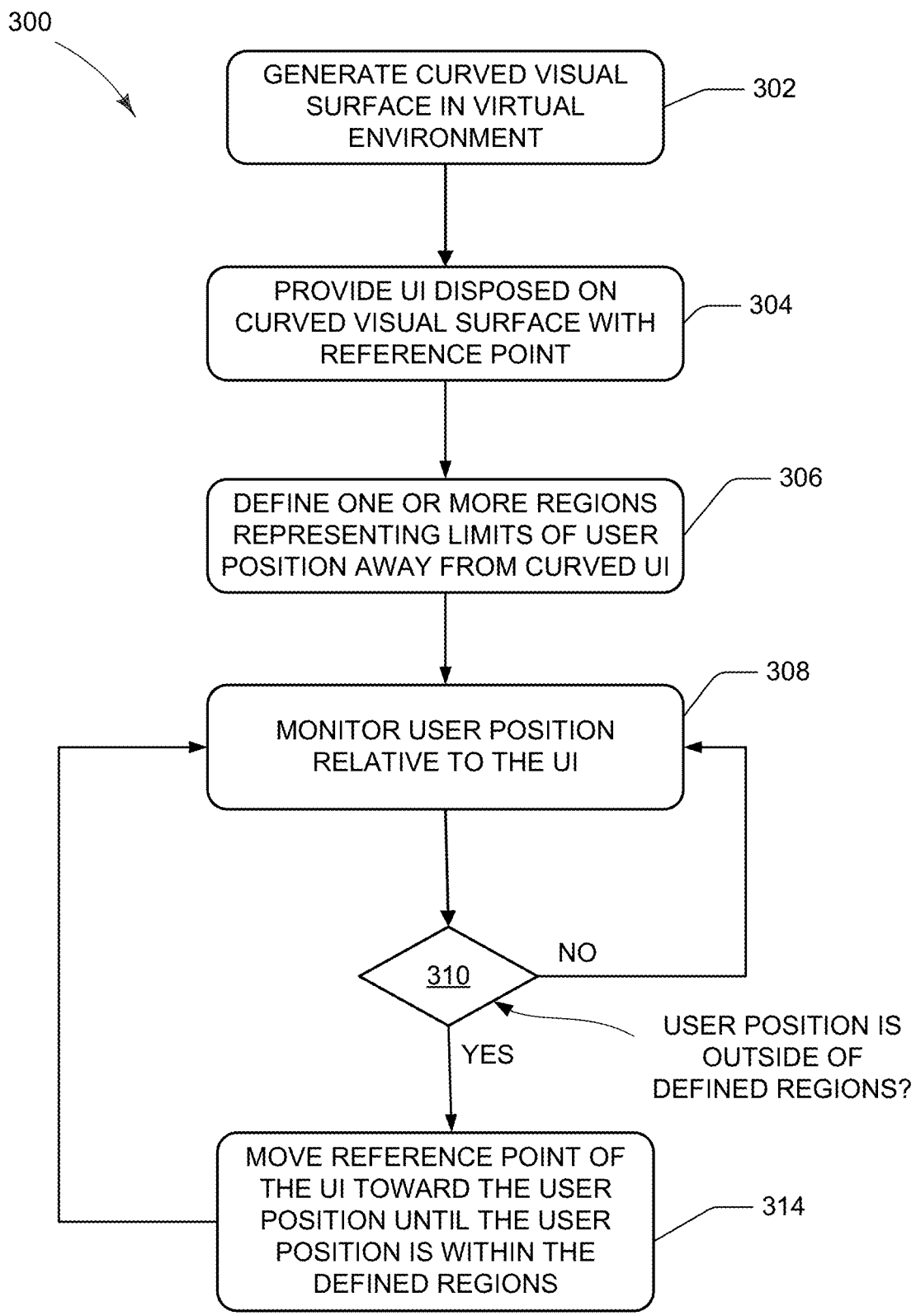
FIG. 3A is a flowchart illustrating an example of an implementation of a process for re-positioning a UI in a VR or AR environment in response to movement of a user away from the UI in accordance with the present disclosure.

FIG. 3A is a flowchart illustrating an example of an implementation of a process 300 for re-positioning UI 210 in VR or AR environment 200 in response to movement of user 202 away from the UI in accordance with the present disclosure. At 302, the VR or AR device generates the curved visual surface in the VR or AR environment 200 and, at 304, provides computer generated UI 210 that is rendered or disposed on the curved visual surface. At 306, one or more regions 220 are defined that represent the boundaries of the user's movement away from the UI 210. As noted with respect to FIGS. 2A, 2B, 2C, 2D, 2E and 2F, the regions 220 may be defined in a variety of ways.

At 308, the VR or AR device monitors the position of user 202 with respect to the UI 210. At 310, the VR or AR device determines whether the user position is outside of the defined regions 220 relative to UI 210. If the user position is outside of the defined regions 220, then, at 314, the reference point 212 of UI 210 is moved towards the user position until the user position is within the defined regions 220. Otherwise, the process continues monitoring the user position at 308.

Process 300 thereby operates to maintain the UI 210 at a distance from user 202 as determined by the definition of region or regions 220. Note that the direction of movement of the reference point toward the user position can take a variety of forms, such as moving the reference point directly toward the user position or moving the reference point along a vector that is substantially parallel with a vector from the reference point toward the user position. A variety of approaches to movement may be utilized without departing from the claim scope.

Figure 3B:
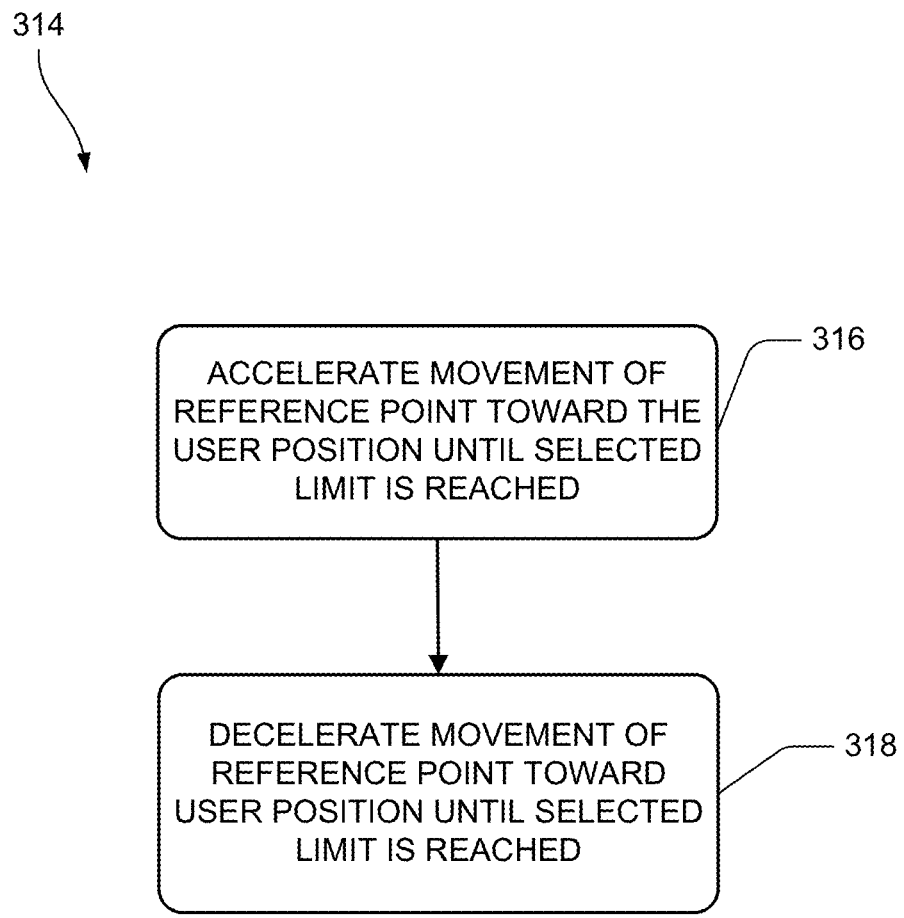
FIG. 3B is a flowchart illustrating an example of an implementation of the re-positioning movement for the UI shown in FIG. 3A.

FIG. 3B is a flowchart illustrating an example of an implementation of the re-positioning movement 314 for the UI 210 shown in FIG. 3A. In this example, operation 314 gradually accelerates and decelerates movement of the reference point 212 toward the user 202. The gradual motion further contributes to an effective UI that a user can view and interact with without discomfort.

At 316, the VR or AR device accelerates movement of the reference point toward the user position until a selected limit is reached. The selected limit may take many forms, such as a predetermined maximum rate of movement, a rate of movement calculated based on a distance between the reference point and the user position when the user position was detected to be outside of the defined region 220, or until a midpoint is reached between the reference point and the user position when the user position is detected to be outside of the first region.

Once the selected limit for acceleration is reached, the VR or AR device, at 318, decelerates movement of the reference point toward the user position until another selected limit is reached. For example, the selected limit for deceleration may be when the user position is within a predetermined distance of the first region or when the reference point coincides with the user position. Many approaches to controlling the motion of the reference point may be utilized without departing from the teachings of the present disclosure. The result is an elastic movement effect that improves the usability of the UI and generally reduce potential discomfort by making the motions appear gradual to the user.

Figure 4A:
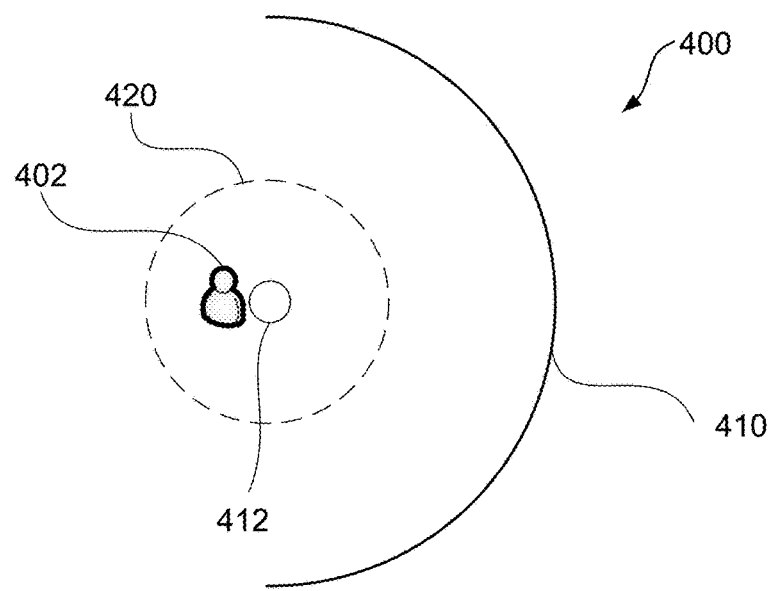
FIG. 4A is a schematic view illustrating an example of an initial position of a curved UI with respect to a user in a VR or AR environment in accordance with another aspect of the present disclosure.

Another aspect of the technologies of the present disclosure is maintenance of a minimum boundary of the user's movement with respect to a UI. In this aspect, one or more regions are defined that represent boundaries on the minimum spacing or distance of a user from a UI. FIG. 4A is a schematic view illustrating an example of an initial position of a curved UI 410 with respect to a user 402 in a VR or AR environment 400 in accordance with another aspect of the present disclosure. In this example, a geometric region 420 is defined with respect to user 402 that represents boundaries on the minimum spacing or distance of the curved UI 410 from the user's position. Initially, curved UI 410 is generated by a VR or AR device such that reference point 412 of curved UI 410 coincides with the position of user 402.

Figure 4B:
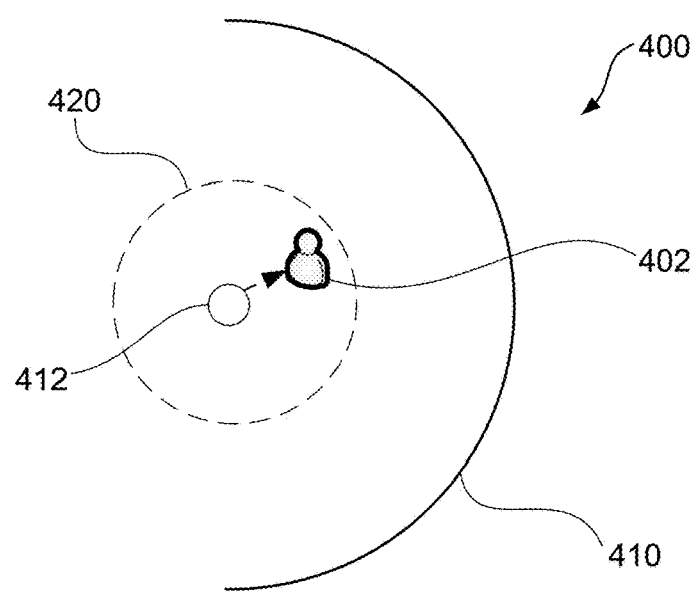
FIG. 4B is a schematic view illustrating an example of movement of a user toward a curved UI within a defined geometric region in a VR or AR environment that does not result in movement of the UI in accordance with the present disclosure.

The user 402 is able to move with respect to the curved UI 410 without necessarily causing movement of the UI. FIG. 4B is a schematic view illustrating an example of movement of user 402 toward curved UI 410 within defined region 420 in VR or AR environment 400 that does not result in movement of the UI 410 in accordance with the present disclosure. In this example, user 402 has moved toward UI 410, but user 402 is inside defined region 420 with the result that UI 410 is not moved due to the user's movement.

Figure 4C:
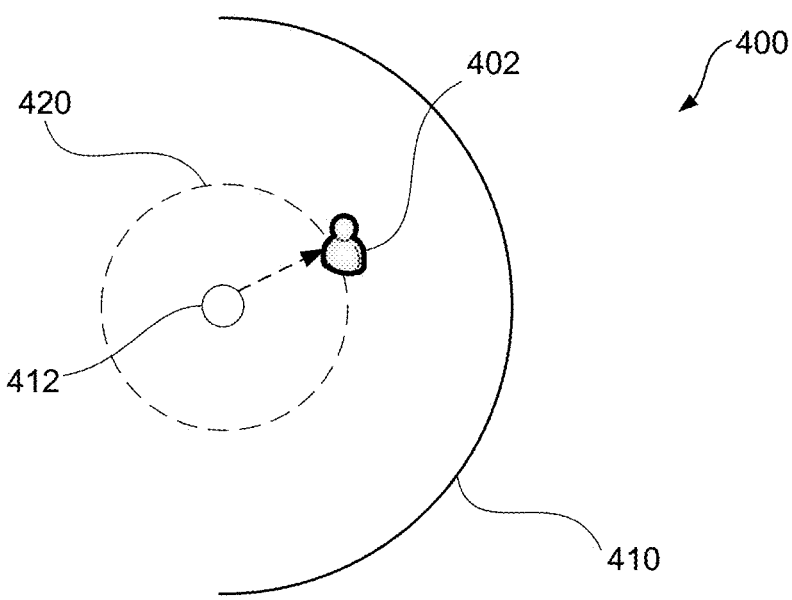
FIG. 4C is a schematic view illustrating an example of movement of a user toward a curved UI with respect to a defined geometric region in a VR or AR environment that does result in movement of the UI in accordance with the present disclosure.
Figure 4D:
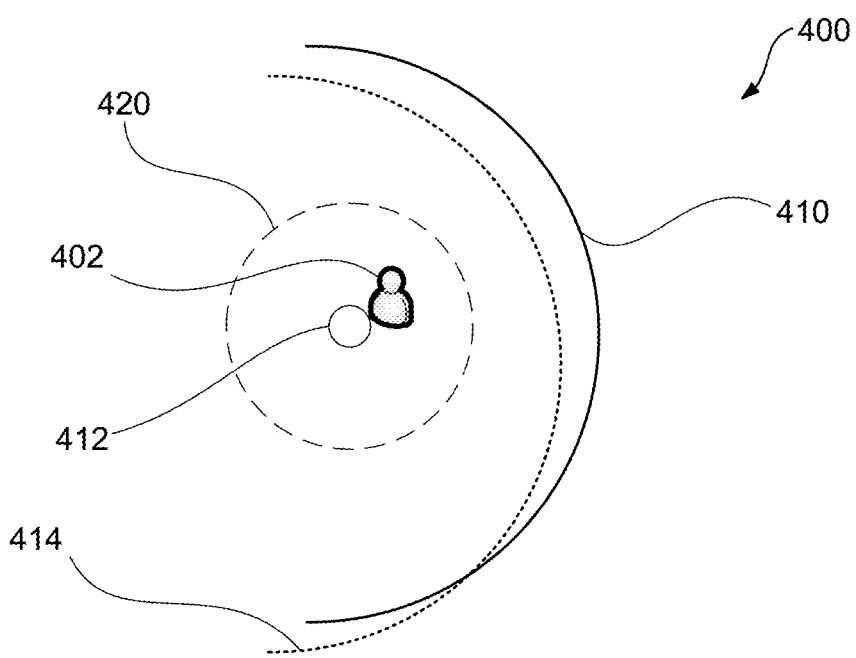
FIG. 4D is a schematic view illustrating an example of movement of a curved UI toward the user in a VR or AR environment in response to the user movement shown in FIG. 4C in accordance with the present disclosure.

FIG. 4C is a schematic view illustrating an example of movement of user 402 toward curved UI 410 with respect to defined region 420 in VR or AR environment 400 that does result in movement of the UI in accordance with the present disclosure. Here, the motion of user 402 toward curved UI 210 has continued resulting in the user position being outside of defined region 420. When this condition is detected, the optical system generating the image of UI 410 moves reference point 412 toward user 402 until the user position and reference point 412 coincide within region 420, in this example, causing the UI 410 to move from its original position 414 to the current position shown in FIG. 4D. Note that whether the reference point 412 is moved until it is merely within region 420 or whether the UI 410 is re-centered on the user position by moving reference point 412 to coincide with the user position is a matter of design choice and does not depart from the claimed scope.

Note that, in some examples, the region 220 that defines the maximum distance and region 420 that defines the minimum region may be defined with the same boundaries. For example, they may both be defined by a circle defined with respect to the reference point of the UI. The result is that the circle defines a range of motion permitted for the user that does not cause movement of the UI.

Figure 4E:
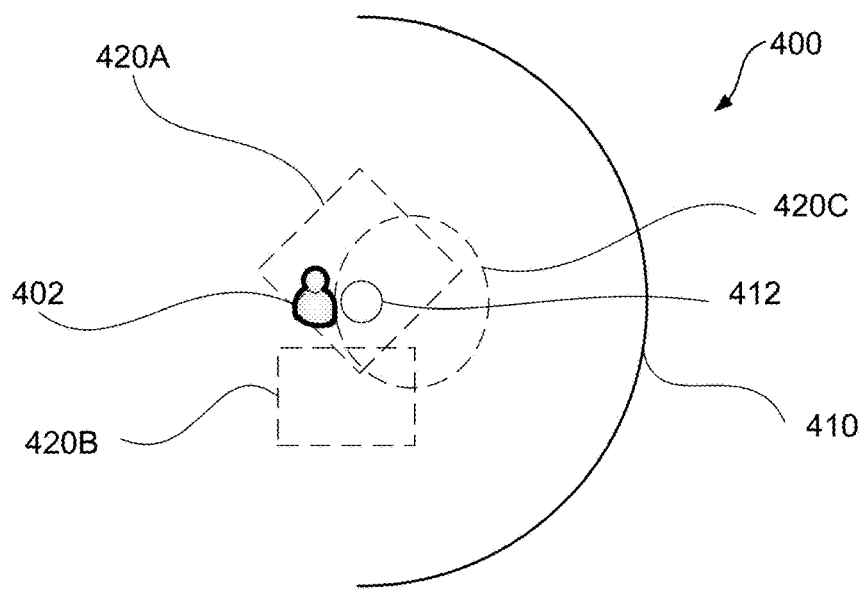
FIG. 4E is a schematic view illustrating additional examples of defined geometric regions of space relative to a curved UI in a VR or AR environment in accordance with the present disclosure.

The defined region 420 is shown as a circle centered on reference point 412. However, a variety of approaches may be utilized in defining the region 420 including different shapes, different relative positions, and multiple shapes. FIG. 4E is a schematic view illustrating additional examples of defined geometric regions 420A, 420B and 420C of space relative to curved UI 410 in 3D virtual 400 environment in accordance with the present disclosure. Region 420A is a diamond, region 420B is a rectangle, and region 420C is an ellipse, each with reference point 412 offset from a center of the region.

Figure 4F:
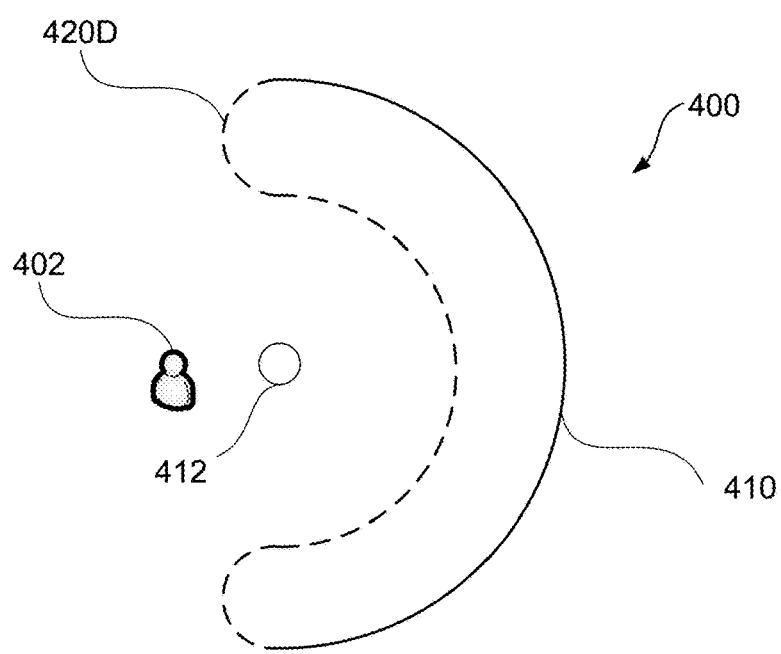
FIG. 4F is a schematic view illustrating an additional example of a defined region of space relative to a curved UI in a VR or AR environment in accordance with the present disclosure.

However, region 420 need not be defined geometrically and may be defined with respect to the curved UI 420 rather than reference point 412. FIG. 4F is a schematic view illustrating an additional example of defined region 420D of space relative to curved UI 410 in VR or AR environment 400 in accordance with the present disclosure. In this example, if user 402 moves within region 420D, then reference point 412 is moved toward the user's position until the user is no longer within region 420D. One of ordinary skill in the art will appreciate that many variations on the examples shown may be made without departing from the teachings of the present disclosure.

Figure 5:
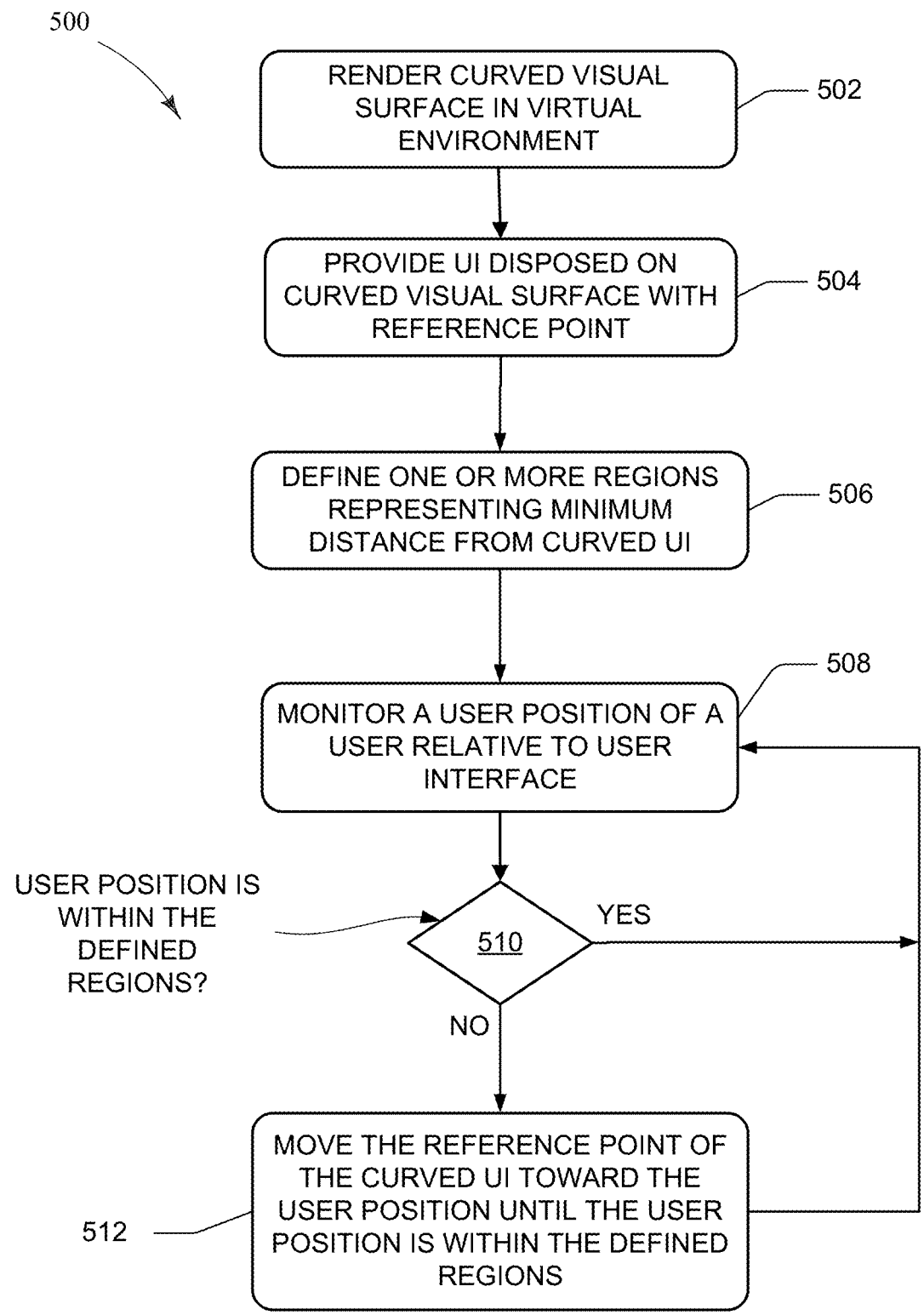
FIG. 5 is a flowchart illustrating an example of an implementation of a method for re-positioning a curved UI in VR or AR environment in response to movement of a user toward the UI in accordance with the present disclosure.

FIG. 5 is a flowchart illustrating an example of an implementation of a process 500 for re-positioning UI 410 in VR or AR environment 400 in response to movement of user 402 toward from the UI in accordance with the present disclosure. At 502, the VR or AR device generates a curved visual surface in the VR or AR environment 400 and, at 504, provides computer generated UI 410 that is rendered or disposed on the curved visual surface with reference point 412. At 506, one or more regions 420 are defined that represent the boundaries of the user's movement toward the UI 410. As noted with respect to FIGS. 4A, 4B, 4C, 4D, 4E and 4F, the regions 420 may be defined in a variety of ways.

At 508, the VR or AR device monitors the position of user 402 with respect to the UI 410. At 510, the VR or AR device determines whether the user position is outside of the defined region 420 relative to UI 410. If the user position is outside of the defined regions 420, then, at 514, the reference point 412 of UI 410 is moved towards the user position until the user position is within the defined region 420. Otherwise, process 500 continues monitoring the user position at 508. Process 500 thereby operates to maintain the UI 410 at a distance from the user 402 within boundaries determined by the definition of region or regions 420.

Note that the logic of process 500 as shown pertains to the examples of FIGS. 4A, 4B, 4C, 4D and 4E, wherein the region or regions 420 are defined with respect to reference point 412. Process 500 may be adapted for regions defined with respect to the curved UI 410, such as region 420D in FIG. 4F, by inverting the logic at 510 and 512 such that the reference point 412 is moved toward the user position when the user position is within defined region 420D. Also note that the movement described with respect to operation 512 may function in a manner similar to approach described with respect to FIG. 3B.

Figure 6A:
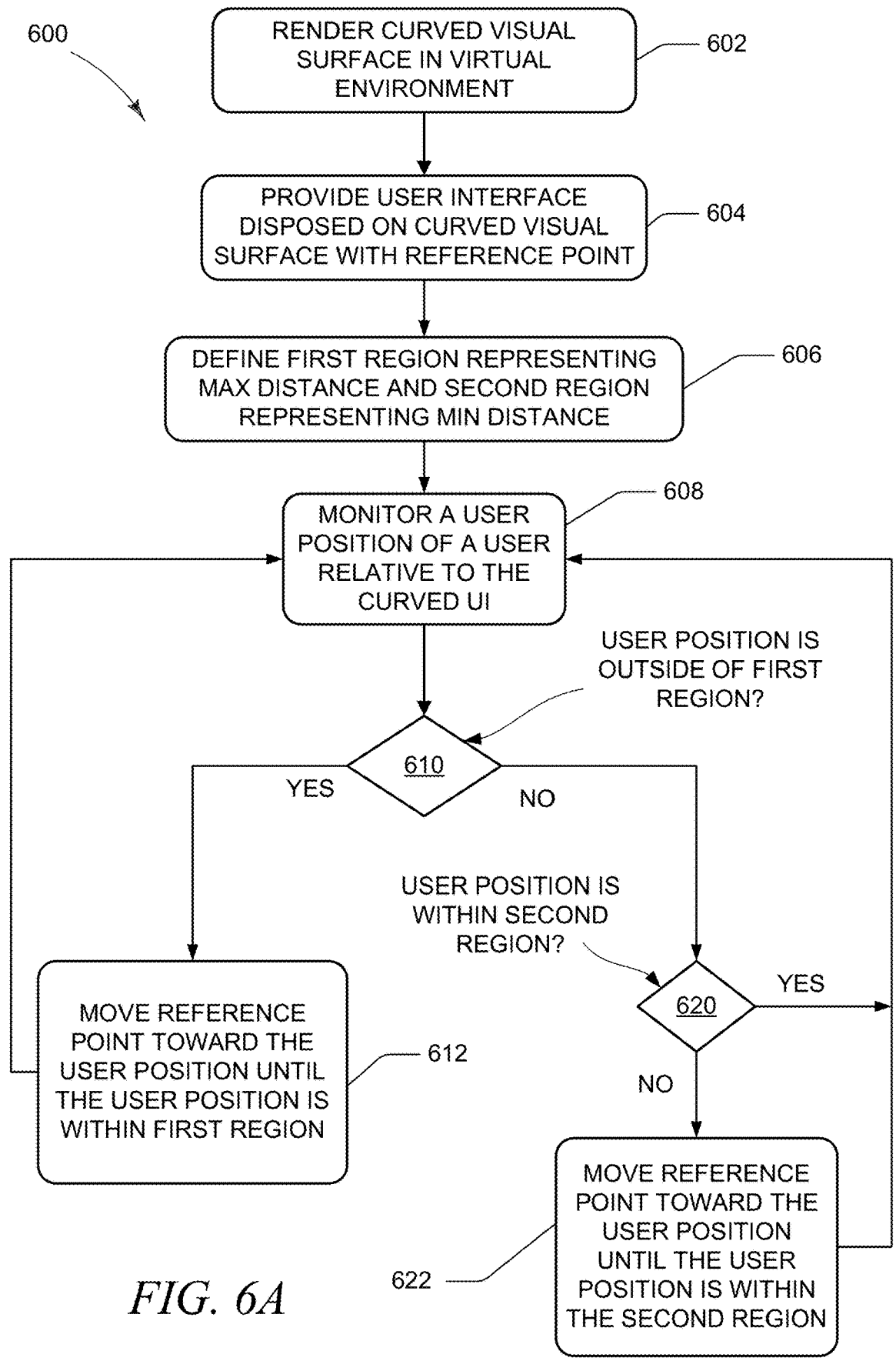
FIG. 6A is a flowchart illustrating an example of an implementation of a process for re-positioning a curved UI in VR or AR environment in response to movement of a user toward the UI or from the UI in accordance with the present disclosure.

The techniques described above for controlling the spacing between a user and a UI may be combined such that limits on minimum spacing and maximum spacing are both maintained. FIG. 6A is a flowchart illustrating an example of an implementation of a process 600 for re-positioning a UI, such as curved UI 210 or 410, in a VR or AR environment in response to movement of a user toward the UI or from the UI in accordance with the present disclosure. At 602, an VR or AR device generates a curved visual surface in the VR or AR environment 200 or 400 and, at 604, provides computer generated UI 210 or 410 that is rendered or disposed on the curved visual surface with reference point 212 or 412. At 606, a first region, such as the regions 220 described in FIGS. 2A-F, is defined that determines boundaries of the user's movement away from UI 210 or 410 and a second region, such as the regions 420 described in FIGS. 4A-E, is defined that determines the boundaries of the user's movement toward the UI 210 or 410.

At 608, the VR or AR device monitors the position of the user with respect to the UI. At 610, the VR or AR device determines whether the user position is outside of the first defined region 220. If the user position is outside of the first defined region 220, then, at 514, the reference point 412 of UI 410 is moved towards the user position until the user position is within the defined region 220, which results in UI 410 being maintained with the maximum spacing boundaries with respect to the user that are determined by the first region 220.

If, at 610, the user position is not outside of the first region 220, then process 600 continues to 620 to determine whether the user position is within the second region 420. If the user position is outside the second region 420, then, at 622, the reference point is moved toward the user position until the user position is within the second region 420. Process 600 thereby operates to maintain the UI 410 spaced from the user 402 within boundaries determined by the definition of region 220 and 420.

Note that process 600 may be adapted for regions defined with respect to the curved UI 410, such as region 420D in FIG. 4F, by inverting the logic at 620 and 622 such that the reference point 412 is moved toward the user position when the user position is within defined region 420D. Also note that the movement described with respect to operations 612 and 622 may function in a manner similar to approach described with respect to FIG. 3B.

Figure 6B:
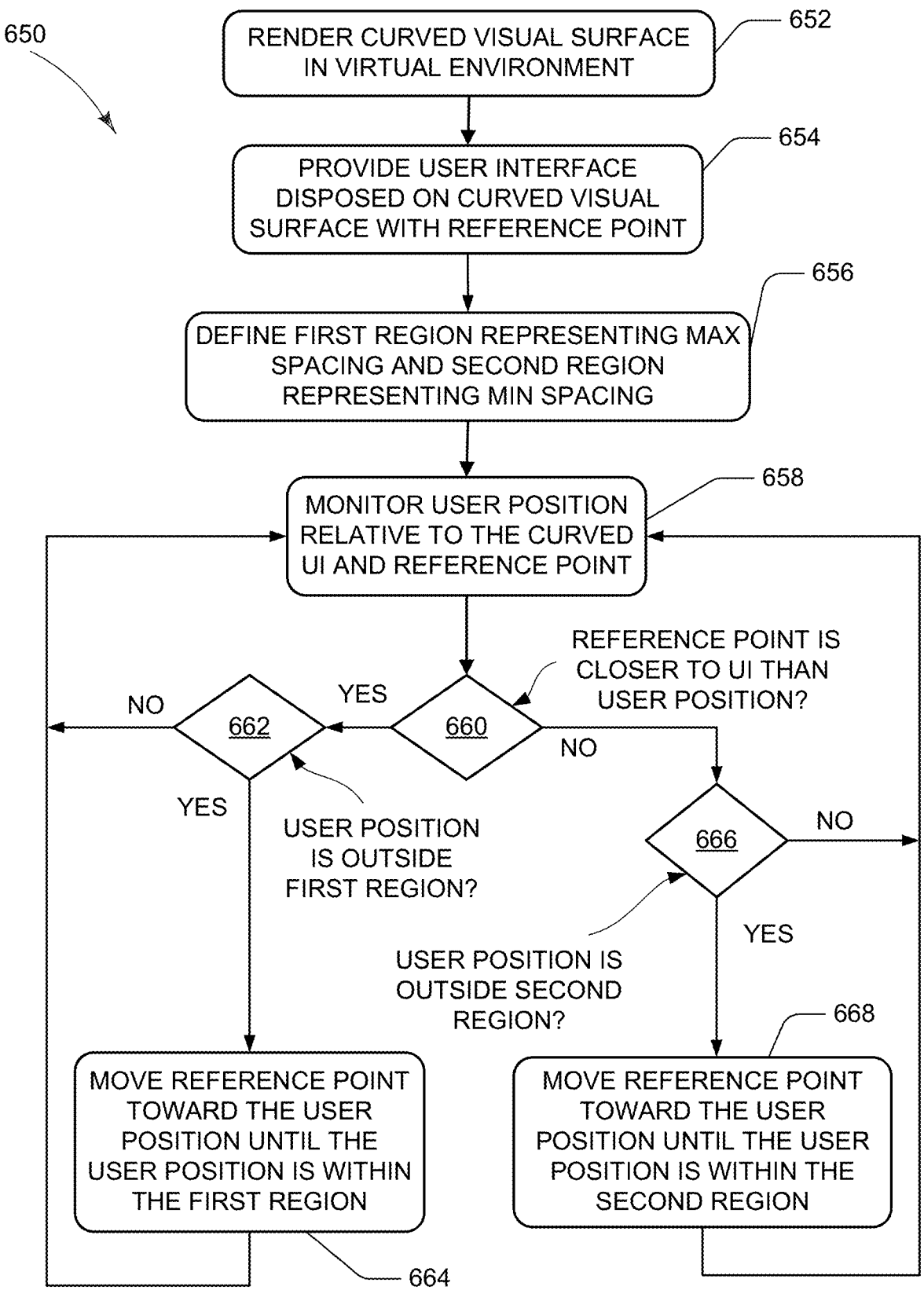
FIG. 6B is a flowchart illustrating another example of an implementation of a process for re-positioning a curved UI in a VR or AR environment in response to movement of a user toward the UI or from the UI in accordance with the present disclosure.

FIG. 6B is a flowchart illustrating another example of an implementation of a process 650 for re-positioning a UI in a VR or AR environment in response to movement of a user toward the UI or from the UI in accordance with the present disclosure. In this alternative example, an evaluation is made with respect to whether the reference point is between the user position and the UI. At 652, an VR or AR device generates a curved visual surface in the VR or AR environment 200 or 400 and, at 654, provides computer generated UI 210 or 410 that is rendered or disposed on the curved visual surface with reference point 212 or 412. At 656, a first region, such as the regions 220 described in FIGS. 2A-F, is defined that determines boundaries of the user's movement away from UI 210 or 410 and a second region, such as the regions 420 described in FIGS. 4A-E, is defined that determines the boundaries of the user's movement toward the UI 210 or 410.

At 658, the VR or AR device monitors the position of the user with respect to the UI 210 or 410 and the reference point 212 or 412. At 660, the VR or AR device determines whether the reference point 212 or 412 is closer to UI 210 or 410 than the user position. For example, the VR or AR device can calculate a distance of the reference point to a point on the UI surface that is closest to the reference point, calculate a distance of the user position to a point on the UI surface that is closest to the user position, and compare the two calculated distances to determine which whether the user position is closer to the UI than the reference point. In another example, the VR or AR device may calculate the distance of each of the user position and the reference point from a line between the endpoints of the curved UI 210 or 410. One of ordinary skill in the art will appreciate that many approaches to this determination can be utilized with the teachings of the present disclosure without departing from the scope of the claims.

If, at 660, the reference point 212 or 414 is closer to the UI 210 or 410 than the user position, then, at 662, the VR or AR device determines whether the user position is outside the first region 220. If not, then control returns to 658 to monitor the user position. If the user position is outside the first region 220, then, at 664, the reference point 212 or 412 is moved toward the user position until the user position is within the first region 220, which moves the UI within the maximum spacing defined for the user position relative to the UI, and control passes to 658.

If the reference point 212 or 414 is not closer to the UI 210 or 410 than the user position at 660, then, at 666, the VR or AR device evaluates whether the user position is outside the second region 420 and, if it is, then, at 668, the reference point 212 or 414 is moved toward the user position until the user position is within the second region 420, which moves the UI within the minimum spacing defined for the user position relative to the UI, and control passes to 658. If the user position is within the second region 420, then control passes to 658 to continue monitoring the user position.

The alternative process 650 thereby operates to maintain the UI 210 or 410 spaced from the user 402 within a maximum spacing determined by the definition of first region 220 and a minimum spacing determined by the definition of second region 420. Note that the movement described with respect to operations 664 and 668 may function in a manner similar to approach described with respect to FIG. 3B. Note that process 650 may be adapted for regions defined with respect to the UI, such as region 420D in FIG. 4F, by inverting the logic at 662 and 664 such that the reference point 212 or 412 is moved toward the user position when the user position is within defined region 420D.

As noted above, a system is utilized to generate a UI in a VR or AR environment and control the spacing of the UI from a user. FIG. 7 is a schematic diagram illustrating one example of a headset system that may be utilized with the disclosed technologies as an VR or AR device or system to control the spacing of a UI from a user in a VR or AR environment in accordance with the present disclosure.

Figure 7:
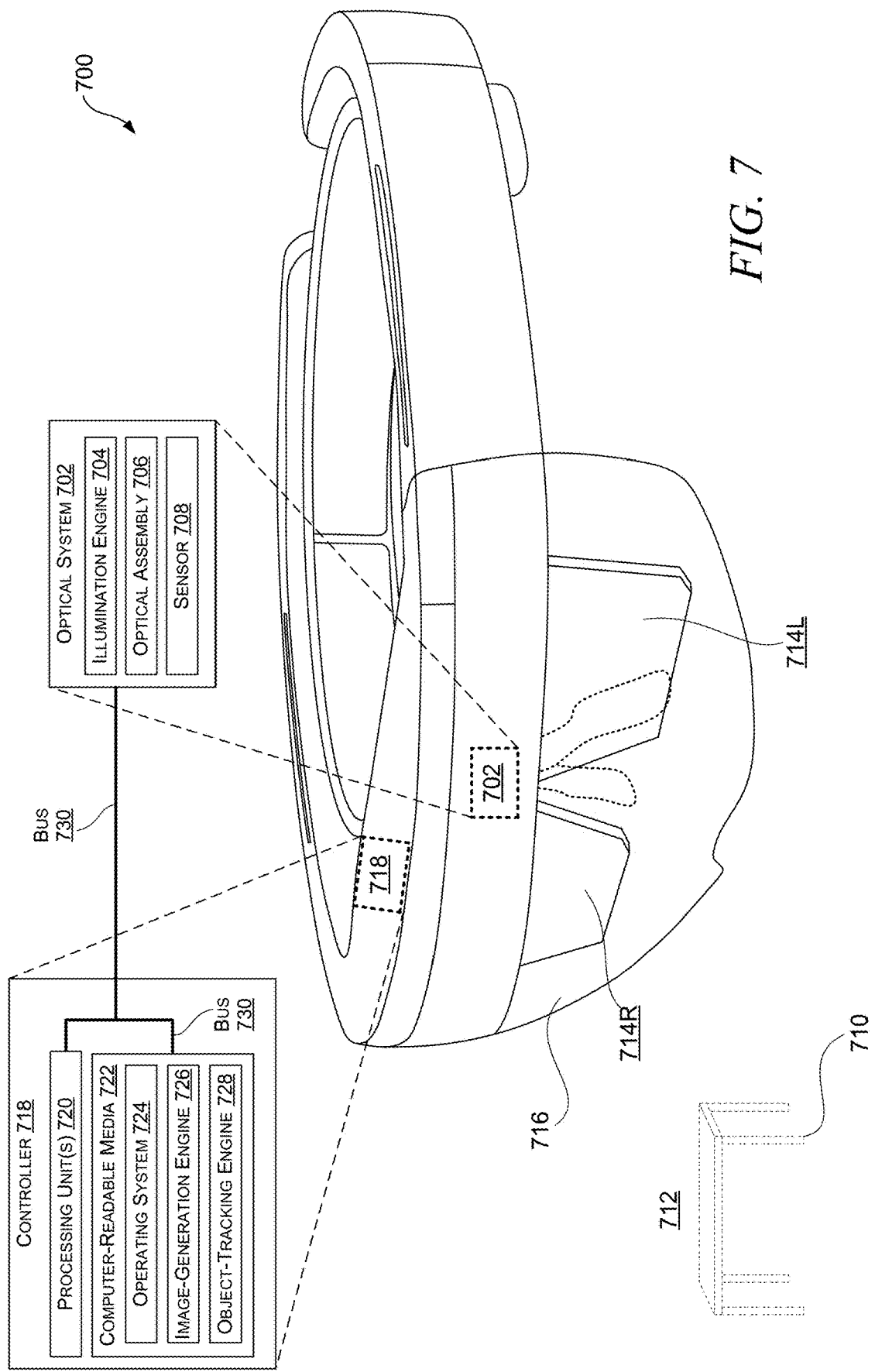
FIG. 7 is a perspective-view of an example of an implementation of an augmented reality headset suitable for applying certain aspects of the approach of the present disclosure.

Referring now to FIG. 7, a front-view of an example implementation of an AR device or NED device 700 is shown that may be suitable for generating a curved visual surface and UI as discussed above. In this example, device 700 incorporates an optical system 702 that includes an illumination engine 704 to generate electro-magnetic ("EM") radiation that includes both a first bandwidth for generating computer-generated ("CG") images and a second bandwidth for tracking physical objects. The first bandwidth may include some or all of the visible-light portion of the EM spectrum whereas the second bandwidth may include any portion of the EM spectrum that is suitable to deploy a desired tracking protocol.

In this example, the optical system 702 further includes an optical assembly 706 that is positioned to receive the EM radiation from the illumination engine 704 and to direct the EM radiation (or individual bandwidths of thereof) along one or more predetermined optical paths. For example, the illumination engine 704 may emit the EM radiation into the optical assembly 706 along a common optical path that is shared by both the first bandwidth and the second bandwidth. The optical assembly 706 may also include one or more optical components that are configured to separate the first bandwidth from the second bandwidth (e.g., by causing the first and second bandwidths to propagate along different image-generation and object-tracking optical paths, respectively).

The optical assembly 706 includes one or more micromechanical system ("MEMS") scanners that are configured to direct the EM radiation with respect to one or more components of the optical assembly 706 and, more specifically, to direct the first bandwidth for image-generation purposes and to direct the second bandwidth for object-tracking purposes. In this example, the optical system 702 further includes a sensor 708 to generate object data in response to a reflected-portion of the second bandwidth, i.e. a portion of the second bandwidth that is reflected off an object 710 that exists within a real-world environment 712.

In some examples, the NED device 700 may utilize the optical system 702 to generate a composite view (e.g., from a perspective of a user that is wearing the NED device 700) that includes both one or more CG images and a view of at least a portion of the real-world environment 712 that includes the object 710. For example, the optical system 702 may utilize various technologies such as, for example, augmented reality ("AR") technologies to generate composite views that include CG images superimposed over a real-world view. As such, the optical system 702 may be configured to generate CG images via a display panel 714.

In the illustrated example, the display panel 714 includes separate right eye and left eye transparent display panels, labeled 714R and 714L, respectively. In some examples, the display panel 714 may include a single transparent display panel that is viewable with both eyes and/or a single transparent display panel that is viewable by a single eye only. Therefore, it can be appreciated that the techniques described herein may be deployed within a single-eye Near Eye Display ("NED") system (e.g. GOOGLE GLASS) and/or a dual-eye NED system (e.g. MICROSOFT HOLOLENS). The NED device 700 is an example device that is used to provide context and illustrate various features and aspects of the UI display techniques and systems disclosed herein. Other devices and systems, such as VR systems, may also use the interface display techniques and systems disclosed herein.

In some examples, the display panel 714 may be a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the NED device 700 may further include an additional see-through optical component 716, shown in FIG. 7 in the form of a transparent veil or visor 716 positioned between the real-world environment 712 (which real-world environment makes up no part of the claimed invention) and the display panel 714. It can be appreciated that the transparent veil 716 may be included in the NED device 700 for purely aesthetic and/or protective purposes. The NED device 700 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc.

In the illustrated example, a controller 718 is operatively coupled to each of the illumination engine 704, the optical assembly 706 (and/or MEMS scanner(s) thereof) and the sensor 708. The controller 718 includes one or more logic devices and one or more computer memory devices storing instructions executable by the logic device(s) to deploy functionalities described herein with relation to the optical system 702, such as the UI examples discussed above. The controller 718 can comprise one or more processing units 720, one or more computer-readable media 722 for storing an operating system 724 and data such as, for example, image data that defines one or more CG images and/or tracking data that defines one or more object tracking protocols. The UI, as discussed above, is one example of the CG images that may be generated by the controller 718.

The computer-readable media 722 may further include an image-generation engine 726 that generates output signals to modulate generation of the first bandwidth of EM radiation by the illumination engine 704 and also to control the MEMS scanner(s) to direct the first bandwidth within the optical assembly 706. Ultimately, the MEMS scanner(s) direct the first bandwidth through the display panel 714 to generate CG images that are perceptible to a user, such as a UI. The computer-readable media 722 may further include an object-tracking engine 728 that generates output signals to modulate generation of the second bandwidth of EM radiation by the illumination engine 704 and also the MEMS scanner(s) to direct the second bandwidth along an object-tracking optical path to irradiate the object 710.

The object tracking engine 728 communicates with the sensor 708 to receive the object data that is generated based on the reflected-portion of the second bandwidth. The object tracking engine 728 then analyzes the object data to determine one or more characteristics of the object 710 such as, for example, a depth of the object 710 with respect to the optical system 702, an orientation of the object 710 with respect to the optical system 702, a velocity and/or acceleration of the object 710 with respect to the optical system 702, or any other desired characteristic of the object 710. The components of the NED device 700 are operatively connected, for example, via a bus 730, which can include one or more of a system bus, a data bus, an address bus, a PCI bus, a Mini-PCI bus, and any variety of local, peripheral, and/or independent buses.

The processing unit(s) 720, can represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 722, can store instructions executable by the processing unit(s) 720. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

The disclosure presented herein encompasses the subject matter set forth in the following clauses:

Example 1

A system for controlling a user interaction with a user interface ("UI") in a virtual reality ("VR") or augmented reality ("AR") environment, the system comprising: one or more processors; and a memory in communication with the one or more processors, the memory having computer-readable instructions stored thereupon that, when executed by the processor, cause the processor to operate to: generate (304) a UI (210) in the VR or AR environment, the UI (210) having a reference point (212) defined relative to a position of the UI (210) in the virtual environment; monitor (308) a user position of a user relative to the UI; detect (310) when the user position is outside of a first region (220) defined relative to the reference point; and responsive to detecting that the user position (310) is outside the first region (220), move (314) the reference point of the UI toward the user position until the user position is within the first region.

Example 2

The system of Example 1, wherein move the reference point of the UI toward the user position until the user position is within the first region comprises: accelerating movement of the reference point toward the user position until one or more of a predetermined rate of movement is reached, a rate of movement is reached that is related to a distance between the reference point and the user position when the user position was detected to be outside of the first region, or until a midpoint is reached, where the midpoint between the reference point and the user position is determined when the user position is detected to be outside of the first region; and decelerating the movement of the reference point toward the user position when the user position is within a predetermined distance of the first region.

Example 3

The system of any of the above Examples, where the memory further includes instructions that cause the processor to operate to detect when the user position is within a second region associated with the UI and, responsive thereto, move the reference point of the UI in the virtual environment toward the user position until the user position is not within the second region.

Example 4

The system of any of the above Examples, wherein at least one of the first and second regions is defined using at least one of: one or more geometric shapes defined with respect to the user position; one or more geometric shapes defined with respect to the UI; one or more regions defined with respect to the user position; and one or more regions defined with respect to the UI.

Example 5

The system of any of the above Examples, wherein move the reference point of the UI toward the user position until the user position is within the first region comprises: moving the reference point of the UI toward the user position along a vector that is substantially parallel to a vector from the user position to the reference point.

Example 6

The system of any of the above Examples, wherein the reference point is located at one of a center point and a focal point of a curvature of the UI.

Example 7

The system of any of the above Examples, wherein the first region defines a maximum spacing between the user position and the UI.

Example 8

A computer-implemented method for controlling a user interaction with a virtual reality ("VR") or augmented reality ("AR") environment, the method comprising: generating (504) a UI (UI) in the VR or AR environment, the UI having a reference point defined relative to a position of the UI in the VR or AR environment; monitoring (508) a user position of a user relative to the UI; detecting (510) when the user position is within a first region (420) defined relative to the reference point, where the first region defines a minimum spacing between the user position and the UI; and responsive to determining that the user position is within the first region, moving the reference point of the UI in the VR or AR environment toward the user position until the user position is not within the first region.

Example 9

The computer-implemented method of Example 8, wherein moving the reference point of the UI toward the user position until the user position is not within the first region further comprises: accelerating movement of the reference point toward the user position until one or more of a predetermined rate of movement is reached, a rate of movement is reached that is related to a distance between the reference point and the user position when the user position was detected to be outside of the first region, or until a midpoint is reached, where the midpoint between the reference point and the user position is determined when the user position is detected to be outside of the first region; and decelerating the movement of the reference point toward the user position when the user position is within a predetermined distance of the first region.

Example 10

The computer-implemented method of any of the above Examples, further comprising detecting when the user position is outside of a second region associated with the UI, wherein the second region defines a maximum spacing between the user position and the UI, and, responsive thereto, moving the reference point of UI in the VR or AR environment toward the user position until the user position is within the second region.

Example 11

The computer-implemented method of any of the above Examples, wherein at least one of the first and second regions is defined using at least one of: one or more geometric shapes defined with respect to the user position; one or more geometric shapes defined with respect to the UI; one or more regions defined with respect to the user position; and one or more regions defined with respect to the UI.

Example 12

The computer-implemented method of any of the above Examples, wherein moving the reference point of the UI toward the user position until the user position is not within the first region further comprises moving the reference point of the UI toward the user position along a vector that is substantially parallel to a vector from the reference point toward the user position.

Example 13

The computer-implemented method of any of the above Examples, wherein the reference point is located at a focal point of a curvature of the UI.

Example 14

The computer-implemented method of any of the above Examples, wherein the first region is defined relative to the UI and moving the reference point of the UI in the VR or AR environment further comprises moving the reference point toward the user position until the user position is within the second region.

Example 15

A computer-implemented method for controlling a user interaction with a virtual reality ("VR") or augmented reality ("AR") environment, the method comprising: generating (654) a UI (410) on a curved visual surface in the VR or AR environment, the UI having a reference point (412) defined relative to a position of the UI in the VR or AR environment; defining (656) a first region (220) representing maximum spacing of a user position relative to the UI and a second region (420) representing minimum spacing of the user position relative to the UI; monitoring (658) the user position relative to the UI; determining (660) whether the reference point is closer to the UI than the user position; when the user position is closer to the UI than the user position: determining (662) whether the user position is outside of the first region, and when the user position is outside the first region, moving (664) the reference point of the UI toward the user position until the user position is within the first region; and when the user position is not closer to the UI than the user position: determining (666) whether the user position is outside of the second region, and when the user position is outside the second region, moving (668) the reference point of the UI toward the user position until the user position is within the second region.

Example 16

The computer-implemented method of Example 15, wherein moving the reference point of the UI toward the user position until the user position is within the first region further comprises: accelerating movement of the reference point toward the user position until one or more of a predetermined rate of movement is reached, a rate of movement is reached that is related to a distance between the reference point and the user position when the user position was detected to be outside of the first region, or until a midpoint is reached, where the midpoint between the reference point and the user position is determined when the user position is detected to be outside of the first region; and decelerating the movement of the reference point toward the user position when the user position is within a predetermined distance of the first region.

Example 17

The computer-implemented method of any of the above Examples, wherein at least one of the first region and the second region is defined using at least one of: one or more geometric shapes defined with respect to the user position; one or more geometric shapes defined with respect to the UI; one or more regions defined with respect to the user position; and one or more regions defined with respect to the UI.

Example 18

The computer-implemented method of any of the above Examples, wherein moving the reference point of the UI toward the user position until the user position is within the first region further comprises: moving the reference point of the UI toward the user position along a vector that is substantially parallel to a vector from the user position to the reference point.

Example 19

The computer-implemented method of any of the above Examples, wherein the reference point is located at a focal point of a curvature of the UI.

Example 20

The computer-implemented method of claim 15, wherein the second region is defined relative to the UI; wherein determining whether the user position is outside of the second region comprises detecting when the user position is within the second region, and wherein moving the reference point of the UI in the VR or AR environment toward the user position until the user position is outside the second region comprises moving the reference point of the UI in the VR or AR environment toward the user position until the user position is within the second region.

What is claimed is:

1. A system for controlling a user interaction with a computer-generated user interface ("UI") displayed in a virtual reality ("VR") or augmented reality ("AR") environment, the system comprising:
   one or more processors; and
   a memory in communication with the one or more processors, the memory having computer-readable instructions stored thereupon that, when executed by the processor, cause the processor to operate to:
   generate the UI in the VR or AR environment, the UI having a reference point existing in the VR or AR environment and defined relative to a position of the UI in the VR or AR environment;
   monitor a user position of a user relative to the UI;
   detect when the user position is outside of a first region defined relative to the reference point; and
   responsive to detecting that the user position is outside the first region, move the reference point of the UI in the VR or AR environment toward the user position until the user position is within the first region.

2. The system of claim 1, wherein move the reference point of the UI toward the user position until the user position is within the first region comprises:
   accelerating movement of the reference point toward the user position until one or more of a predetermined rate of movement is reached, a rate of movement is reached that is related to a distance between the reference point and the user position when the user position was detected to be outside of the first region, or until a midpoint is reached, where the midpoint between the reference point and the user position is determined when the user position is detected to be outside of the first region; and
   decelerating the movement of the reference point toward the user position when the user position is within a predetermined distance of the first region.

3. The system of claim 1, where the memory further includes instructions that cause the processor to operate to detect when the user position is within a second region associated with the UI where the second region defines a minimum spacing between the user position and the UI and, responsive thereto, move the reference point of the UI in the VR or AR environment toward the user position until the user position is not within the second region.

4. The system of claim 3, wherein at least one of the first and second regions is defined using at least one of:
   one or more geometric shapes defined with respect to the user position;
   one or more geometric shapes defined with respect to the UI;
   one or more regions defined with respect to the user position; and
   one or more regions defined with respect to the UI.

5. The system of claim 1, wherein move the reference point of the UI toward the user position until the user position is within the first region comprises:
   moving the reference point of the UI toward the user position along a vector that is substantially parallel to a vector from the user position to the reference point.

6. The system of claim 1, wherein the reference point is located in the VR or AR environment at a center point of a curvature of the UI or a focal point of the curvature of the UI.

7. The system of claim 1, wherein the first region defines a maximum spacing between the user position and the UI.

8. A computer-implemented method for controlling a user interaction with a virtual reality ("VR") or augmented reality ("AR") environment, the method comprising:
   generating a user interface ("UI") in the VR or AR environment, the UI having a reference point existing in the VR or AR environment and defined relative to a position of the UI in the VR or AR environment;
   monitoring a user position of a user relative to the UI;
   detecting when the user position is within a first region defined relative to the reference point, where the first region defines a minimum spacing between the user position and the UI; and
   responsive to determining that the user position is within the first region, moving the reference point of the UI in the VR or AR environment toward the user position until the user position is not within the first region.

9. The computer-implemented method of claim 8, wherein moving the reference point of the UI toward the user position until the user position is not within the first region further comprises:
   accelerating movement of the reference point toward the user position until one or more of a predetermined rate of movement is reached, a rate of movement is reached that is related to a distance between the reference point and the user position when the user position was detected to be outside of the first region, or until a midpoint is reached, where the midpoint between the reference point and the user position is determined when the user position is detected to be outside of the first region; and decelerating the movement of the reference point toward the user position when the user position is within a predetermined distance of the first region.

10. The computer-implemented method of claim 8, further comprising detecting when the user position is outside of a second region associated with the UI, wherein the second region defines a maximum spacing between the user position and the UI, and, responsive thereto, moving the reference point of UI in the VR or AR environment toward the user position until the user position is within the second region.

11. The computer-implemented method of claim 10, wherein at least one of the first and second regions is defined using at least one of:
   one or more geometric shapes defined with respect to the user position;
   one or more geometric shapes defined with respect to the UI;
   one or more regions defined with respect to the user position; and
   one or more regions defined with respect to the UI.

12. The computer-implemented method of claim 8, wherein moving the reference point of the UI in the VR or AR environment toward the user position until the user position is not within the first region further comprises moving the reference point of the UI toward the user position along a vector that is substantially parallel to a vector from the reference point toward the user position.

13. The computer-implemented method of claim 8, wherein the reference point is located in the VR or AR environment at a focal point of a curvature of the UI.

14. The computer-implemented method of claim 8, wherein the first region is defined relative to the UI and moving the reference point of the UI in the VR or AR environment further comprises moving the reference point toward the user position until the user position is within the second region.

15. A computer-implemented method for controlling a user interaction with a virtual reality ("VR") or augmented reality ("AR") environment, the method comprising:
   generating a user interface ("UI") on a curved visual surface in the VR or AR environment, the UI having a reference point existing in the VR or AR environment and defined relative to a position of the UI in the VR or AR environment;
   defining a first region representing maximum spacing of a user position relative to the UI and a second region representing minimum spacing of the user position relative to the UI;
   monitoring the user position relative to the UI;
   determining whether the reference point is closer to the UI than the user position;
   when the reference point is closer to the UI than the user position:
      determining whether the user position is outside of the first region, and
      when the user position is outside the first region, moving the reference point of the UI in the VR or AR environment toward the user position until the user position is within the first region; and
   when the reference point is not closer to the UI than the user position:
      determining whether the user position is outside of the second region, and
      when the user position is outside the second region, moving the reference point of the UI in the VR or AR environment toward the user position until the user position is within the second region.

16. The computer-implemented method of claim 15, wherein moving the reference point of the UI in the VR or AR environment toward the user position until the user position is within the first region further comprises:
   accelerating movement of the reference point toward the user position until one or more of a predetermined rate of movement is reached, a rate of movement is reached that is related to a distance between the reference point and the user position when the user position was detected to be outside of the first region, or until a midpoint is reached, where the midpoint between the reference point and the user position is determined when the user position is detected to be outside of the first region; and
   decelerating the movement of the reference point toward the user position when the user position is within a predetermined distance of the first region.

17. The computer-implemented method of claim 15, wherein at least one of the first region and the second region is defined using at least one of:
   one or more geometric shapes defined with respect to the user position;
   one or more geometric shapes defined with respect to the UI;
   one or more regions defined with respect to the user position; and
   one or more regions defined with respect to the UI.

18. The computer-implemented method of claim 15, wherein moving the reference point of the UI in the VR or AR environment toward the user position until the user position is within the first region further comprises:
   moving the reference point of the UI toward the user position along a vector that is substantially parallel to a vector from the user position to the reference point.

19. The computer-implemented method of claim 15, wherein the reference point is located in the VR or AR environment at a focal point of a curvature of the UI.

20. The computer-implemented method of claim 15,
   wherein determining whether the user position is outside of the first region comprises detecting when the user position is within the second region, and
   wherein moving the reference point of the UI in the VR or AR environment toward the user position until the user position is outside the second region comprises moving the reference point of the UI in the VR or AR environment toward the user position until the user position is within the first region.

* * * * *